United States Patent
Park et al.

(10) Patent No.: US 8,774,863 B2
(45) Date of Patent: Jul. 8, 2014

(54) APPARATUS AND METHOD FOR CONTROLLING BUILT-IN MICROPHONE OF PORTABLE TERMINAL

(75) Inventors: Sang-Kyu Park, Seongnam-si (KR);
Seung-Yup Lee, Yongin-si (KR);
Jung-Ho Park, Seoul (KR); Soo-Ho Song, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1265 days.

(21) Appl. No.: 12/113,577

(22) Filed: May 1, 2008

(65) Prior Publication Data
US 2008/0274770 A1 Nov. 6, 2008

(30) Foreign Application Priority Data
May 4, 2007 (KR) .................. 10-2007-0043405

(51) Int. Cl.
*H04B 1/38* (2006.01)
*H04M 1/00* (2006.01)
*H04Q 1/30* (2006.01)
*H01R 3/00* (2006.01)

(52) U.S. Cl.
USPC ......... 455/557; 455/575.2; 340/533; 439/488

(58) Field of Classification Search
USPC ....................................... 455/557
See application file for complete search history.

(56) References Cited

U.S. PATENT DOCUMENTS

| | | | | |
|---|---|---|---|---|
| 4,790,002 A | * | 12/1988 | D'Agosto, III et al. | 379/70 |
| 2002/0037746 A1 | * | 3/2002 | Osano | 455/557 |
| 2005/0090141 A1 | | 4/2005 | Peng et al. | |
| 2006/0062400 A1 | * | 3/2006 | Chia-Chun | 381/74 |
| 2007/0082717 A1 | * | 4/2007 | Lee et al. | 455/575.2 |
| 2008/0146292 A1 | * | 6/2008 | Gilmore et al. | 455/572 |
| 2008/0159561 A1 | * | 7/2008 | Parker et al. | 381/94.5 |
| 2008/0164994 A1 | * | 7/2008 | Johnson et al. | 340/533 |

FOREIGN PATENT DOCUMENTS

| | | | |
|---|---|---|---|
| EP | 1199867 | * | 10/2000 |
| EP | 1 670 283 | | 6/2006 |
| EP | 1 684 492 | | 7/2006 |
| JP | 2005109845 | * | 9/2003 |
| JP | 2005-109845 | * | 4/2005 |
| JP | 2005109845 | * | 4/2005 |
| KR | 102005010983 | | 11/2005 |
| KR | 102007001783 | | 2/2007 |

OTHER PUBLICATIONS

Motorola Manual entitled "Motorola Rokr E2," exhibited in CES Trade Show, Jan. 2006.

* cited by examiner

*Primary Examiner* — Timothy Pham
(74) *Attorney, Agent, or Firm* — The Farrell Law Firm, P.C.

(57) ABSTRACT

An apparatus and method for controlling a built-in microphone of a portable terminal is provided. The method includes detecting a call connection event when a call connection request is received or transmitted; checking information on a currently connected connection device upon detecting the call connection event; and when the information shows that the connected connection device is an earphone, activating a speaker included in the earphone and activating the built-in microphone.

16 Claims, 2 Drawing Sheets

APPARATUS AND METHOD FOR CONTROLLING BUILT-IN MICROPHONE OF PORTABLE TERMINAL

PRIORITY

This application claims priority under 35 U.S.C. §119(a) to a Korean patent application filed in the Korean Intellectual Property Office on May 4, 2007 and assigned Serial No. 2007-43405, the entire disclosure of which is hereby incorporated by reference.

BACKGROUND OF THE INVENTION

1. Field of the Invention

The present invention relates to an apparatus and method for controlling a built-in microphone of a portable terminal. More particularly, the present invention relates to an apparatus and method in which a built-in microphone of a portable terminal is controlled such that, when a call connection event occurs for call reception/origination in the portable terminal connected with an earphone without a microphone, an output audio signal is output to the connected earphone and an input audio signal is received through the built-in microphone.

2. Description of the Related Art

Recently, with the rapid development of portable terminals, a mobile phone providing wireless voice call and data exchange is regarded as a necessity of life. Conventional portable terminals have generally been regarded as portable devices providing wireless calls. However, along with technical advances and introduction of the wireless Internet, portable terminals are now used for many purposes in addition to telephone calls or schedule management. For example, images can be captured by using a digital camera included in a portable terminal. Further, the portable terminal provides a variety of functions such as watching a satellite broadcasting program, games, Web surfing using the wireless Internet, watching video, listening to music, e-mail services, and so on.

In particular, a headset may be used to receive services in a public place by using a portable terminal capable of playing back video and music. When launched, the portable terminal generally includes a headset so that a user can receive music and audio services through a speaker included in the headset. In addition, when a call is made by call connection, a call service can be provided by receiving user's voice through a microphone included in the headset.

However, as high-quality sound can be provided with the continued development of the portable terminal, users are generally no longer satisfied with the quality of sound provided through the headset included in the portable terminal. Thus, such a user must additionally purchase a device for outputting high-quality sound according to personal preference.

In general, the output device purchased by the user is an earphone without a microphone. In this case, when a call connection event occurs for call reception/origination in a state that the earphone without the microphone is connected to the conventional portable terminal, in order to make a call, the earphone connected to the portable terminal has to be disconnected. In addition, the user inconveniently has to take off the earphone from his or her ear. That is, to achieve the high-quality sound, the user has to experience inconvenience during a call connection.

SUMMARY OF THE INVENTION

An aspect of the present invention is to address at least the above-mentioned problems and/or disadvantages and to provide at least the advantages described below. Accordingly, an aspect of the present invention is to provide an apparatus and method for controlling a built-in microphone of a portable terminal.

Another aspect of the present invention is to provide an apparatus and method for controlling a built-in microphone of a portable terminal, in which a connection device is checked upon detecting a call connection event and whether to use the built-in microphone is determined according to the connection device.

Another aspect of the present invention is to provide an apparatus and method in which a built-in microphone of a portable terminal is controlled such that, when a call connection event occurs for call reception/origination in the portable terminal connected with an earphone without a microphone, an output audio voice signal is output to the connected earphone and an input audio signal is received through the built-in microphone.

According to an aspect of the present invention, a portable terminal for controlling a built-in microphone is provided. The portable terminal includes a built-in speaker for outputting an output audio signal; a built-in microphone for receiving an input audio signal; a connector for connecting an earphone or a headset; a connection device checker for checking information on a connection device connected to the connector; and a controller for controlling the connection device checker to check information on the currently connected connection device upon detecting a call connection event when a call connection request is received or transmitted, and, if the connection device is the earphone, for controlling a speaker included in the earphone and activating the built-in microphone.

According to another aspect of the present invention, a method of controlling a built-in microphone of a portable terminal is provided. The method includes detecting a call connection event when a call connection request is received or transmitted; checking information on a currently connected connection device upon detecting the call connection event; and if the checking result shows that the connected connection device is an earphone, activating a speaker included in the earphone and activating the built-in microphone.

BRIEF DESCRIPTION OF THE DRAWINGS

The above and other aspects, features and advantages of certain exemplary embodiments of the present invention will become more apparent from the following detailed description when taken in conjunction with the accompanying drawings in which.

DETAILED DESCRIPTION OF THE PREFERRED EMBODIMENTS

Preferred embodiments of the present invention will be described below with reference to the accompanying drawings. In the following description, well-known functions or constructions are not described in detail since they would obscure the invention in unnecessary detail.

The present invention relates to an apparatus and method in which a built-in microphone of a portable terminal is controlled such that, when a call connection event occurs for call reception/origination in the portable terminal connected with an earphone without a microphone, an output audio signal is output to the connected earphone and an input audio signal is received through the built-in microphone. The present invention will hereinafter be described with reference to FIG. 1.

In the present invention, an earphone is defined as a device that does not include a microphone and includes a speaker for outputting an output audio signal. A wireless earphone is defined as a device that does not include a microphone and includes a speaker for outputting an output audio signal by being wirelessly connected through a wireless connection method such as Bluetooth®. A headset is defined as a device that includes both a microphone and a speaker. A wireless headset is defined as a device that includes both a microphone and a speaker, each of which transmits/receives an audio signal by being wireless connecting through a wireless connection method such as the Bluetooth. The headset or the wireless headset is also referred to as an ear microphone.

Figure 1:
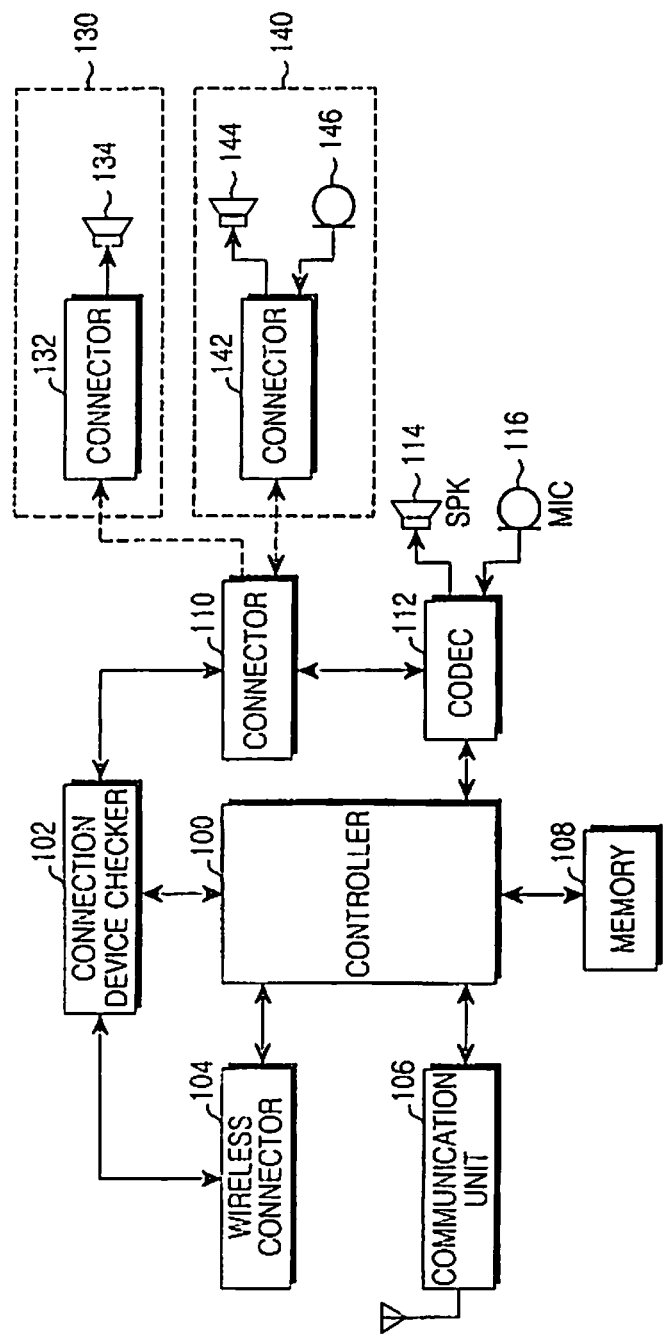
FIG. 1 is a block diagram illustrating a structure of a portable terminal for detecting whether to use a built-in microphone depending on which connection device is used when a call connection event occurs, according to an embodiment of the present invention.

Referring to FIG. 1, the portable terminal of the present invention includes a controller 100, a connection device checker 102, a wireless connector 104, a communication unit 106, a memory 108, a connector 110, a COder-DECoder (CODEC) 112, a built-in speaker 114, and a built-in microphone 116.

The wireless connector 104 wirelessly transmits/receives an audio signal by connecting a wireless device (e.g., wireless earphone or wireless headset) under the control of the controller 100, and provides information on the connected wireless device to the connection device checker 102 at the request of the connection device checker 102. The wireless connector 104 may use a Bluetooth communication technique for wireless connection. When the wireless connector 104 uses the Bluetooth communication technique, a general operation of Bluetooth communication is performed in which a connectable Bluetooth device is searched for under the control of the controller 100 and Bluetooth connection is made by pairing if authentication is required. In the present invention, the wireless connector 104 is optional, and thus may not be provided.

In a receiving operation, the communication unit 106 decreases a frequency of a Radio Frequency (RF) signal received through an antenna, and then performs de-spreading and channel decoding on the received signal. In a transmitting operation, the communication unit 106 performs channel coding and spreading on the received signal, increases the frequency of the received signal, and then transmits the signal through the antenna. In addition, in order to connect a call, the communication unit 106 receives or transmits a call connection request.

The memory 108 stores programs for controlling an overall operation of the portable terminal, application programs, and data (e.g., telephone numbers, Short Message Service (SMS) messages, compressed image files, video, etc.).

Through a wired connection, the connector 110 may be physically connected to a connector 132 of an earphone 130 including only a speaker 134 or may be physically connected to a connector 142 of a headset 140 including both a speaker 144 and a microphone 146. The connector 110 may be composed of one socket that can connect both the earphone 130 and the headset 140. Alternatively, the connector 110 may be composed of a first socket for connecting the earphone 130 and a second socket for connecting the headset 140 so as to be respectively connected to a plurality of devices.

The CODEC 112 connected to the controller 100, the built-in speaker 114 connected to the CODEC 112, and the built-in microphone 116 are provided as an audio input/output block used for a voice call. The CODEC 112 converts Pulse Code Modulation (PCM) data provided from the controller 100 into an analog audio signal and then transmits the analog audio signal to the built-in speaker 114, or transmits the analog audio signal through the earphone 130 and the speaker 144 of the headset 140. In addition, the CODEC 112 converts an input audio signal received through the built-in microphone 116 or through the microphone 146 of the headset 140 into data, and then transmits the data to the controller 100.

At the request of the controller 100, the connection device checker 102 checks the wireless connector 104 so as to determine whether a wireless earphone or a wireless headset is connected. In addition, the connection device checker 102 checks the connector 110 so as to determine whether an earphone or a headset is connected. Then, the connection device checker 102 provides the controller 100 with information on the connected device.

Upon detecting a call connection event when a call connection request is received or transmitted, the controller 100 requests the connection device checker 102 to send information on a connection device currently connected, and receives information on the connection device from the connection device checker 102 and thus selects a device for inputting/outputting an audio signal according to the connection device.

In other words, under the control of the controller 100, upon detecting the call connection event, information on the connection device currently connected is checked through the connection device checker 102, and if the connection device is either an earphone or a wireless earphone, an output audio signal is output to the connected earphone or the wireless earphone, and the input audio signal is received by activating the built-in microphone 116 of the portable terminal. If the information on the connection device is a headset (or wireless headset), audio signal is input/output by activating a speaker and a microphone of the headset (or wireless headset). If no connection device is connected, the audio signal is input/output by activating the built-in speaker 114 and the built-in microphone 116 of the portable terminal. In addition, under the control of the controller 100, when the call connection event occurs, if the connection device information obtained by the connection device checker 102 shows that two or more connection devices are connected, the connection devices for providing services are selected according to a predetermined priority. For example, if the connector 110 has a plurality of connection sockets and detects the call connection event in a state that both an earphone and a headset are connected, then the audio signal is input/output by activating the speaker and microphone of the headset under the control of the controller 100.

Meanwhile, the controller 100 controls the connection device checker 102. That is, the controller 100 may perform a function of the connection device checker 102. The controller 100 and the connection device checker 102 are described as being separately implemented in the present invention, this is for explanation purposes only. Thus, in practice, the connection device checker 102 may be incorporated into the controller 100 or may be provided separately from the controller 100.

Figure 2:
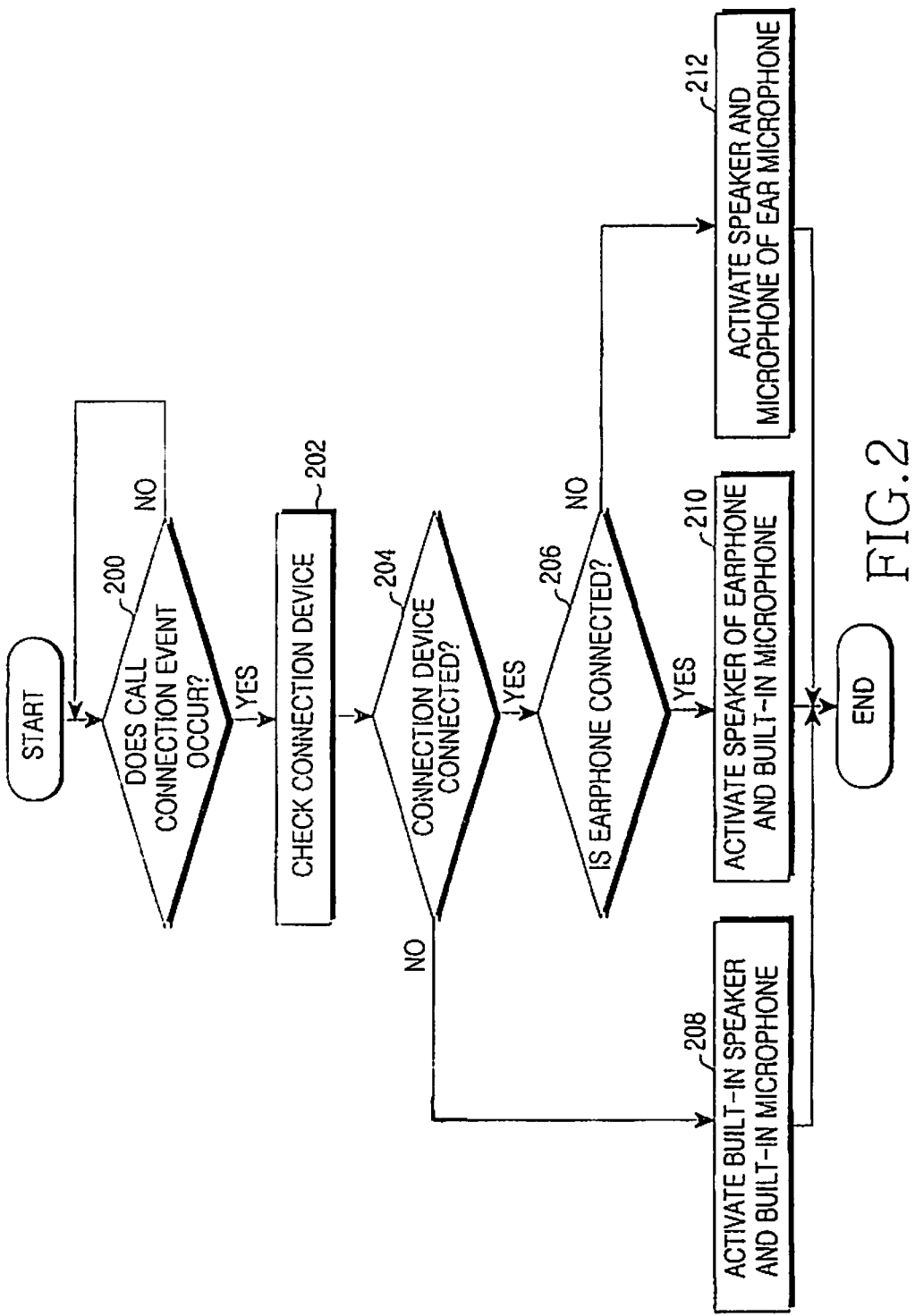
FIG. 2 is a flowchart illustrating a process of determining whether to use a built-in microphone depending on which connection device is used when a call connection event occurs in a portable terminal, according to an embodiment of the present invention.

Now, a method of controlling a microphone of a portable terminal according to the present invention will be described with reference to FIG. 2. FIG. 2 is a flowchart illustrating a process of determining whether to use a built-in microphone depending on which connection device is used when a call connection event occurs in a portable terminal, according to an embodiment of the present invention.

Referring to FIG. 2, upon detecting a call connection event in step 200, information on a connected connection device is checked in step 202.

In step 204, existence of the connection device is determined according to the checking result of step 202. If the determination result of step 204 shows that no connection device is connected, a built-in speaker and a built-in earphone are activated in step 208, so as to input/output an audio signal.

If the determination result of step 204 shows that a connection device is connected, it is determined whether the connected connection device is an earphone in step 206. If the determination result of step 206 shows that the connected connection device is the earphone, a speaker of the earphone and a built-in microphone of the portable terminal are activated in step 210, so that the output audio signal is output through the speaker of the earphone and the input audio signal is received through the built-in microphone.

If the determination result of step 206 shows that the connected connection device is not the earphone but a headset, the speaker and microphone of the headset are activated so that the audio signal is input/output through the ear microphone.

Although it has been described in FIG. 2 that the earphone and the headset are connected, the earphone described in FIG. 2 may be a wireless earphone, and the headset may be a wireless headset.

According to the present invention, an apparatus and method is provided in which a microphone of a portable terminal is controlled such that, when a call connection event occurs for call reception/origination in the portable terminal connected with an earphone without a microphone, an output audio signal is output to the connected earphone and an input audio signal is received through a built-in microphone of the portable terminal. Therefore, a call can be made without having to disconnect the earphone from the portable terminal, thereby providing convenience to users.

While the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A portable terminal for controlling a built-in microphone of the portable terminal, comprising:
   a built-in speaker configured to output an output audio signal;
   the built-in microphone configured to receive an input audio signal;
   a connector configured to connect a connection device, the connection device including an external speaker to output the output audio signal; and
   a controller configured to control to:
      receive a call, and
      activate the built-in microphone of the portable terminal,
   wherein the activating the built-in microphone of the portable terminal is based upon a determination by the portable terminal that the connection device connected to the connector does not include an external microphone,
   wherein the controller controls to output the output audio signal via the external speaker and to receive the input audio signal via the built-in microphone of the portable terminal, and
   wherein the controller controls to maintain a deactivation of the built-in microphone of the portable terminal when the call is received if the connection device connected to the connector includes the external microphone,
   wherein, upon receiving the call while a plurality of connection devices are connected to the portable terminal, the controller selects one connection device among the plurality of connection devices as the connection device to output the output audio signal, and
   wherein the controller is further configured to control to output the output audio signal via the external speaker and to receive the input audio signal via the external microphone while maintaining a deactivation of the built-in speaker and the built-in microphone based upon the determination by the portable terminal that the connection device connected to the connector includes the external microphone.

2. The portable terminal of claim 1, wherein the controller is further configured to activate, upon determining that the connection device is not connected to the portable terminal, a built-in speaker of the portable terminal and a built-in microphone of the portable terminal.

3. The portable terminal of claim 1, wherein the output audio signal is a voice audio signal.

4. The portable terminal of claim 1, wherein the connector is wirelessly connected to the connection device.

5. The portable terminal of claim 1, wherein the one of the plurality of connection devices is selected as the connection device according to a predetermined priority.

6. A method of controlling a built-in microphone of a portable terminal, the method comprising:
   receiving or transmitting a call; and
   activating the built-in microphone to receive an input audio signal when the call is received or transmitted, wherein the activating the built-in microphone of the portable terminal is based upon a determination by the portable terminal that a connection device connected to the portable terminal does not include an external microphone,
   wherein the portable terminal controls to output an output audio signal via at least one other speaker of the connection device and to receive the input audio signal via the built-in microphone of the portable terminal,
   wherein the portable terminal controls to maintain a deactivation of the built-in microphone of the portable terminal when the call is received or transmitted if the connection device connected to the portable terminal includes the external microphone,
   wherein, upon receiving the call while a plurality of connection devices each including an external speaker are connected to the portable terminal, one connection device among the plurality of connection devices is selected by the portable terminal to output the output audio signal, and
   wherein, based upon the determination by the portable terminal that the connection device connected to the portable terminal includes the external microphone, the audio signal is output via the external speaker and the audio signal is received via the external microphone while the built-in speaker and the built-in microphone are deactivated.

7. The method of claim 6, further comprising activating, upon determining that the connection device is not connected to the portable terminal, a built-in speaker of the portable terminal and a built-in microphone of the portable terminal.

8. The method of claim 6, wherein the output audio signal is a voice audio signal.

9. The method of claim 6, wherein the one connection device is wirelessly connected to the portable terminal.

10. The portable terminal of claim 6, wherein the one of the plurality of devices is selected as the connection device according to a predetermined priority.

11. A portable terminal controlling a built-in microphone of the portable terminal, the portable terminal comprising:
   means for determining, when a call is transmitted or received by the portable terminal, whether a connection device including an external speaker is connected to the portable terminal;
   means for determining, upon determining that the connection device is connected to the portable terminal, whether the connection device further includes an external microphone;
   means for activating, upon determining that the connection device connected to the portable terminal does not include the external microphone, the external speaker and the built-in microphone while deactivating the built-in speaker; and
   means for outputting, based upon the determination by the portable terminal that the connection device connected to the portable terminal includes the external microphone, the audio signal via the external speaker and receiving the input audio signal via the external microphone while deactivating the built-in speaker and the built-in microphone,
   wherein determining whether the connection device is connected to the portable terminal includes selecting, when a plurality of devices each including an external speaker are connected to the portable terminal, one of the plurality of devices as the connection device.

12. The portable terminal of claim 11, further comprising means for activating, upon determining that the connection device is not connected to the portable terminal, a built-in speaker of the portable terminal and a built-in microphone of the portable terminal.

13. The portable terminal of claim 11, wherein the connection device is wirelessly connected to the portable terminal.

14. The portable terminal of claim 11, wherein the one of the plurality of devices is selected as the connection device according to a predetermined priority.

15. A portable electronic device, comprising:
   a controller;
   a memory electrically coupled to the controller;
   a Bluetooth communication connector electrically coupled to the controller, wherein the Bluetooth communication connector is configured to connect to a wireless connection device including a speaker;
   a communication unit electrically coupled to the controller, wherein the communication unit is configured to receive a call;
   a CODEC electrically coupled to the controller;
   a built-in speaker electrically coupled to the CODEC to output an output audio signal;
   a built-in microphone electrically coupled to the CODEC to receive an input audio signal; and
   a connector electrically coupled to the controller and/or the CODEC, wherein the connector is configured to receive a connection device including an external speaker to output an output audio signal;
   wherein, upon receiving the call, the controller is configured to maintain a deactivation of the built-in microphone of the portable electronic device, the maintaining the deactivation of the built-in microphone of the portable electronic device is based upon a determination by the portable electronic device that the connection device connected to the connector includes an external microphone,
   wherein, upon receiving the call, the controller is configured to activate the built-in microphone, such that the activation of the built-in microphone of the portable electronic device is based upon a determination by the portable electronic device that the connection device connected to the connector does not include the external microphone, and
   wherein, upon receiving the call while the wireless connection device and the connection device are simultaneously connected to the portable electronic device, the controller is further configured to selectively provide the output audio signal to only one of the wireless connection device and the connection device.

16. The portable terminal of claim 15, wherein the controller is further configured to selectively provide the audio signal to only one of the wireless connection device or the connection device according to a predetermined priority.

* * * * *

UNITED STATES PATENT AND TRADEMARK OFFICE
CERTIFICATE OF CORRECTION

| | |
|---|---|
| PATENT NO. | : 8,774,863 B2 |
| APPLICATION NO. | : 12/113577 |
| DATED | : July 8, 2014 |
| INVENTOR(S) | : Sang-Kyu Park et al. |

Page 1 of 1

It is certified that error appears in the above-identified patent and that said Letters Patent is hereby corrected as shown below:

In the Claims,

Column 6, line 19, --a determination-- should replace "the determination".

Column 6, line 58, --a determination-- should replace "the determination".

Signed and Sealed this
Twenty-fifth Day of August, 2015

Michelle K. Lee
*Director of the United States Patent and Trademark Office*